United States Patent [19]

McGillicuddy

[11] 3,913,935

[45] Oct. 21, 1975

[54] COLLAPSIBLE CART
[75] Inventor: John R. McGillicuddy, Denver, Colo.
[73] Assignee: Raymond Lee Organization, a part interest
[22] Filed: Dec. 17, 1974
[21] Appl. No.: 532,811

Related U.S. Application Data
[63] Continuation-in-part of Ser. No. 373,647, June 26, 1973, abandoned.

[52] U.S. Cl. .................................. 280/36; 280/41 R
[51] Int. Cl.² ......................................... B62B 11/00
[58] Field of Search .... 280/36 R, 36 B, 41 R, 41 A, 280/41 B

[56] References Cited
UNITED STATES PATENTS
2,398,863  4/1946  Sides ................................ 280/41 R
3,074,734  1/1963  Munson ........................... 280/41 R Primary Examiner—Robert R. Song

[57] ABSTRACT

A collapsible cart has an elongated U shaped frame having parallel legs with free ends forming tips which extend at an acute angle with the plane of the frame. First and second elongated parallel members are each pivotally secured at one end to a corresponding intermediate point on a corresponding leg. The opposite ends of these members define tips which extend at an acute angle to the plane of the members. Caster wheels are secured to each tip. A first basket is detachably secured to and extends between the tips. A second basket is disposed in the frame being detachably pivotally secured to the members. Support means connected between the tips of the frame is detachably securable to an end of the second basket.

3 Claims, 4 Drawing Figures

COLLAPSIBLE CART

CROSS REFERENCE TO COPENDING APPLICATIONS

This application is a continuation-in-part of copending application Ser. No. 373,647 filed June 26, 1973, now abandoned.

SUMMARY OF THE INVENTION

My invention is directed toward a wheeled cart which is lightweight, readily collapsible into relatively small compact space for storage and is easily and quickly erected for use.

To this end, I employ an elongated U shaped frame having parallel legs with free ends defining tips which extend at an acute angle to the plane of the frame. First and second elongated members are each pivotally secured at one end to an intermediate point on a corresponding leg. The members are parallel and have opposite ends defining tips which extend at an acute angle to the plane of the members.

A first basket is detachably secured to and extends between the tips. A second basket disposed within the frame is detachably and pivotally secured to the members by suitable means. Support means connected between the tips of the frame is detachably securable to an end of the second basket. Caster wheels are secured to the tips. The cart can be assembled for use or collapsed easily and quickly as described below.

DETAILED DESCRIPTION OF PREFERRED EMBODIMENTS

Figures 1, 2, 4:
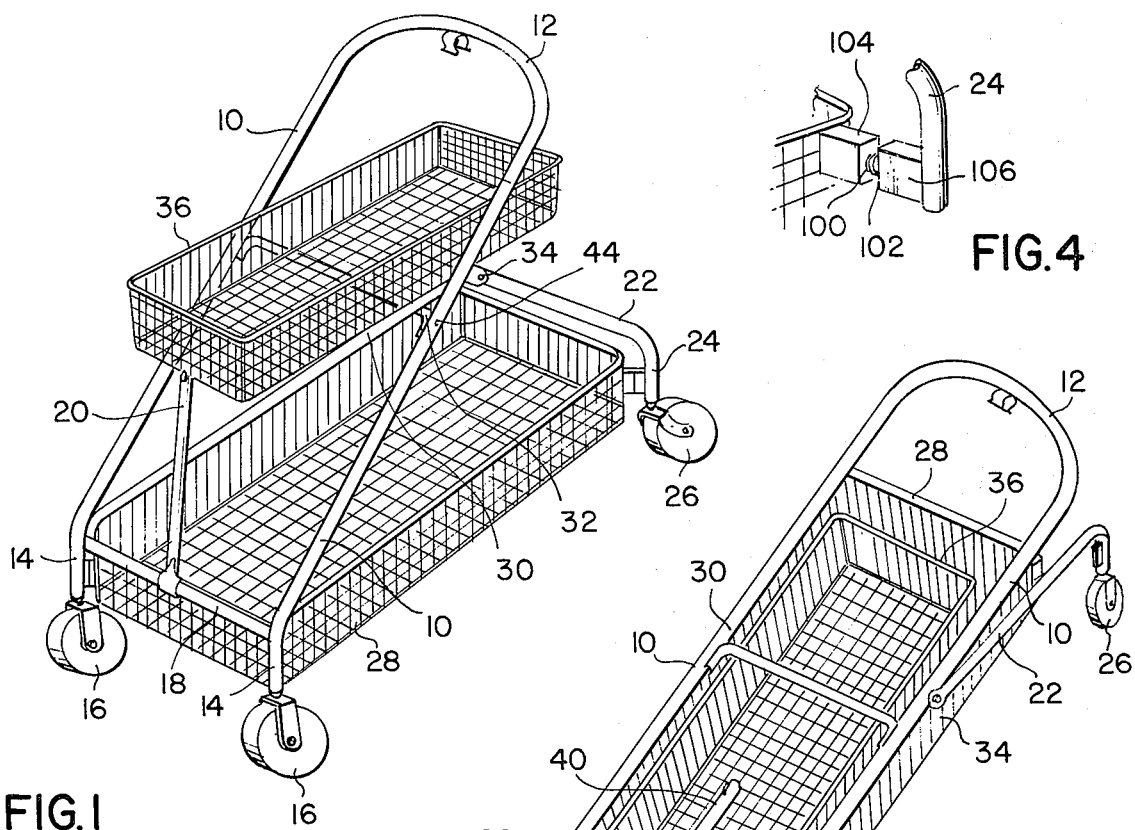
FIG. 1 is a perspective view of the invention in position for use.
FIG. 2 is a similar view but showing the invention in collapsed position.
FIG. 4 is a detail enlarged view of a portion of the structure of FIG. 1.
Figure 3:
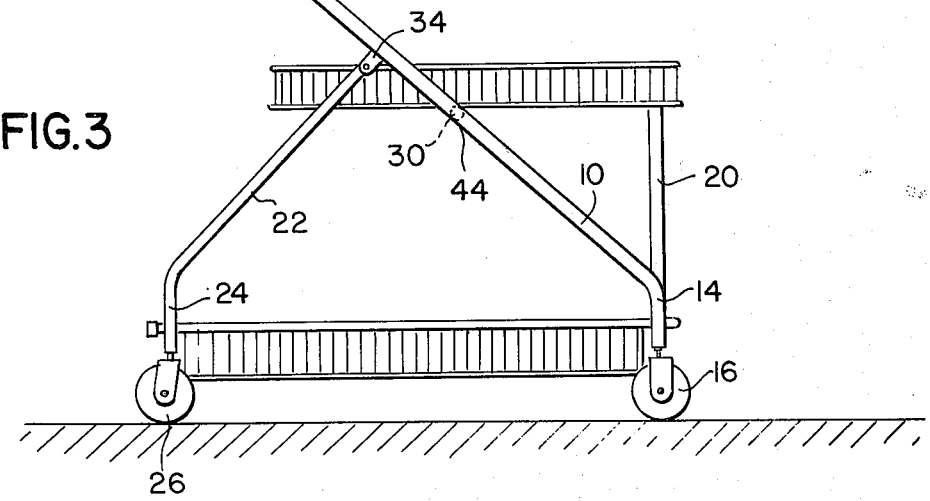
FIG. 3 is a side view of the structure of FIG. 1.

Referring now to FIGS. 1–4, a U-shaped frame has two parallel legs 10 interconnected by a curved piece 12 integral therewith at one set of ends and having opposite parallel free ends defining tips 14 which extend at an acute angle to the plane of the frame. Castor wheels 16 are secured to the tips 14. A bar 18 is secured to and extends between the tips. Bar 20 is pivotally secured at one end to the midpoint of bar 18.

First and second elongated arms 22 are each pivotally secured at one end to a corresponding point 34 on a corresponding arm 10, these points 34 being closer to piece 12 than to tips 14. The arms are parallel and have opposite ends forming tips 24 which extend at an acute angle to the plane of the arms. Castor wheels 26 are secured to tips 24.

A first basket 28 is detachably secured at each end to a corresponding set of tips and extends between tips 14 and tips 24. To this end, ends of basket 28 have extending plates 104 engaging corresponding extending plates 106 on these tips. Male and female mating disengagable and engagable fasteners 100 and 102 provide the engaging action.

An elongated bar 30 extends between the legs 10 with right angled tips 32 pivotally secured to legs 10 at points 44. A second basket 36 rests detachably upon bar 30 in a region intermediate the ends of the basket. The bottom of one end of basket 36 has a catch 38 adapted to detachably engage catch 40 on the free end of bar 20.

The structure can then be collapsed easily with the second basket fitting essentially into the first basket and both baskets disposed within members 10. Legs 22 can be folded. The various parts can be detachably held together in collapsed position by straps or the like. Assembly is easily accomplished by unfolding legs 22, securing basket 28 to the tips, and placing basket 36 on top of bar 30 while connecting catches 38 and 40 with bar 20 vertical. The wheeled cart is easily moved by pulling or pushing on the frame as a handle.

While I have described my invention with particular reference to the drawings, such is not be be considered as limiting its actual scope.

Having thus described this invention, what is asserted as new is:

1. A collapsible cart comprising:
    an elongated U-shaped frame having two parallel legs interconnected by a curved portion integral therewith at one set of ends, the other set of ends forming parallel free ends defining tips extending at an acute angle with the plane of the frame;
    first caster means secured to said frame tips;
    first and second elongated parallel members, each member being pivotally secured at one end to a corresponding leg of the frame at a corresponding point adjacent but spaced from the curved portion of the frame, the opposite ends of the members being parallel and defining tips which extend at an acute angle with the plane of the members;
    second caster means secured to said member tips;
    a first basket detachably secured to and extending between the frame tips and the member tips;
    a second basket;
    third means pivotally disposing said second basket between said members and within said frame; and
    fourth support means connected between the tips of the frame and detachably securable to an end of the second basket at the bottom thereof.

2. The cart of claim 1 wherein the fourth means includes a fourth member connected at each end to a corresponding free end of the frame and extending between these frame ends and a fifth member pivotally secured at one end to the midpoint of the fourth member.

3. The cart of claim 2 wherein the other end of the fifth member is detachably engagable with the said bottom of the end of the second basket.

* * * * *